(12) United States Patent
Negretti et al.

(10) Patent No.: US 10,416,546 B2
(45) Date of Patent: Sep. 17, 2019

(54) INTERACTIVE LIGHT FIXTURE, ILLUMINATION SYSTEM AND KITCHEN APPLIANCE

(71) Applicant: AB ELECTROLUX, Stockholm (SE)

(72) Inventors: Peter Negretti, Forli (IT); Filippo Tisselli, Forli (IT); Filippo Zanetti, Forli (IT); Julen Pejenaute Beorlegi, San Sebastian (ES)

(73) Assignee: AB Electrolux, Stockholm (SE)

( * ) Notice: Subject to any disclaimer, the term of this patent is extended or adjusted under 35 U.S.C. 154(b) by 526 days.

(21) Appl. No.: 14/412,087

(22) PCT Filed: Jul. 5, 2013

(86) PCT No.: PCT/EP2013/064272
§ 371 (c)(1),
(2) Date: Dec. 30, 2014

(87) PCT Pub. No.: WO2014/009277
PCT Pub. Date: Jan. 16, 2014

(65) Prior Publication Data
US 2015/0168821 A1    Jun. 18, 2015

(30) Foreign Application Priority Data
Jul. 9, 2012   (SE) ...................................... 1200428

(51) Int. Cl.
*G03B 21/20*   (2006.01)
*H05B 37/02*   (2006.01)

(52) U.S. Cl.
CPC ....... *G03B 21/206* (2013.01); *H05B 37/0227* (2013.01)

(58) Field of Classification Search
CPC .......................... G03B 21/206; H05B 37/0227
(Continued)

(56) References Cited

U.S. PATENT DOCUMENTS 5,477,283 A * 12/1995 Casey ..................... G03F 1/90
353/62
8,449,141 B1 * 5/2013 Hinrichs ................. F21V 21/15
362/235

(Continued)

FOREIGN PATENT DOCUMENTS

| WO | 2010027250 | 3/2010 |
|----|------------|--------|
| WO | 2011124928 | 10/2011 |
| WO | 2013001432 | 1/2013 |

OTHER PUBLICATIONS https://www.technologyreview.com/s/419639/a-kitchen-countertop-with-a-brain/.*

(Continued)

*Primary Examiner* — Steven Whitesell Gordon
*Assistant Examiner* — Jerry L Brooks
(74) *Attorney, Agent, or Firm* — Pearne & Gordon LLP (57) ABSTRACT

Interactive light fixture (1) comprising a plurality of light sources and a projector unit for illuminating a defined surface area and at least one sensor for sensing objects within the surface area, and comprising a controller unit cooperating with the light sources, projector and sensor, wherein the controller unit in a first operational mode is configured to drive the light sources and/or projector unit in dependency of at least one characteristic object feature of at least one sensed object in order to generate an object-specific illumination design pattern or design figure on the surface area.

20 Claims, 6 Drawing Sheets

(58) Field of Classification Search
USPC .......................................... 353/122; 382/103
See application file for complete search history.

(56) References Cited

U.S. PATENT DOCUMENTS

| | | |
|---|---|---|
| 2002/0186221 A1 | 12/2002 | Bell |
| 2004/0102247 A1 | 5/2004 | Smoot |
| 2004/0178750 A1 | 9/2004 | Belliveau |
| 2006/0001650 A1* | 1/2006 | Robbins ............... G06F 3/0421 345/173 |
| 2009/0213070 A1* | 8/2009 | Kalaldeh ............... G06F 3/0317 345/157 |
| 2010/0182136 A1 | 7/2010 | Pryor |
| 2011/0211110 A1 | 9/2011 | Doublet |
| 2012/0034934 A1 | 2/2012 | Loveland et al. |
| 2012/0057137 A1* | 3/2012 | Enomoto ............ H04N 9/3141 353/61 |
| 2012/0062736 A1 | 3/2012 | Xiong |
| 2012/0327379 A1* | 12/2012 | Enomoto ............... G03B 21/16 353/52 |
| 2013/0343601 A1* | 12/2013 | Jia ....................... G06K 9/00355 382/103 |
| 2014/0139717 A1* | 5/2014 | Short .................... H04N 7/142 348/333.1 |

OTHER PUBLICATIONS

Article: A Kitchen Countertop with a Brian by Tom Simonite Jul. 2, 2010.*
International Search Report for PCT/EP2013/064272, dated Oct. 9, 2013, 3 pages.
"A Kitchen Countertop with a Brain". Jul. 2, 2010, pp. 1-6, Mountain View California. https://www.technologyreview.com/s/419639/a-ktichen-countertop-with-a-brain/.
EP OA for 13734748.0 dated Feb. 5, 2018, 9 pages.

* cited by examiner

INTERACTIVE LIGHT FIXTURE, ILLUMINATION SYSTEM AND KITCHEN APPLIANCE

The present application in particular is directed to an interactive light fixture, in particular interactive lamp, which may be used in common kitchens and similar locations.

For illuminating every day surroundings, in particular kitchens and similar locations, nowadays comparatively sophisticated and elaborate lighting systems are available, which—inter alia—allow a multiplicity of different illumination scenarios, including dimming, color change and the like.

However, considering known lighting and illumination concepts in everyday life conditions, in particular in gastronomic situations, more flexible lighting concepts and possibilities would be desirable. Hence, there is still room for improvements in known lighting and illumination possibilities. In particular, special-effect illuminations, special mood illuminations, mood lightings, and the like may be provided in order to enhance physical comfort and experience during cooking and dining and/or in kitchens and dining rooms.

Therefore it is an object of the invention to provide more flexible lighting and illumination possibilities, in particular in the field of food preparation, cooking and dining.

This object in particular is solved by the features of claims 1 and 13 to 15. Embodiments in particular result from the dependent claims.

According to claim 1, an interactive light fixture, in particular a lamp, preferably implemented as a kitchen appliance, is provided. The interactive light fixture comprises a plurality of light sources, a projector unit, respectively adapted to illuminate or apply illuminating projections to a defined surface area. The surface area may belong or be represented by a surface area in a working area of a kitchen or a surface area of table top in a kitchen or dining room, respectively used or intended for gastronomic purposes at home, in restaurants or at cooking schools and the like.

The interactive light fixture further comprises at least one sensor or sensor unit configured for sensing or detecting objects within the surface area. The surface area in particular represents an area of illumination or field of view of the light fixture. This in particular shall mean that the light fixture is adapted to illuminate the surface area and to record or detect objects therein. The detection of objects may for example relate to a static type detection in which the presence or absence of an object and characteristics thereof may be sensed or detected.

In variants, also dynamic object sensing and detection may be available, where the amount of object movements and displacements within or along the surface area may be sensed or detected.

The light fixture further comprises a controller unit, in particular implemented on an electronics board of the light fixture, which is adapted to cooperate with the light sources, projector unit and sensor. Cooperation in this connection in particular shall mean that the controller unit is able to control respective components, i.e. to send or apply control instructions to them. Cooperation however may also mean that the controller unit receives information from respective components, in particular from the sensor. Cooperation therefore may relate to data or signal transfer between the controller unit and the light sources, projector and sensor. The sensor may be a 2D sensor or a 3D sensor for sensing or detecting the objects, including static objects and object movements within the surface area.

According to the proposed light fixture, the controller unit in a first operational mode is configured and adapted to drive at least one of the light sources, in particular a group thereof, and the projector unit in dependency of at least one characteristic object feature of at least one object sensed or detected from or by the sensor within the surface area, i.e. in the field of view of the light fixture. The object feature may either correspond to or be represented by a sensor signal, or be extracted from sensor signals, such for example from an image of the object. The term "at least one characteristic object feature" in particular shall mean that a single one or several characteristic object features may be used, wherein the object features either belong to a single object or to several objects. The number of objects and number of characteristic features and measured characteristic feature values may correspond to each other or differ from each other. Using several characteristic object features in particular may comprise using a combination of characteristic object features of a one or several objects.

The light fixture, in particular the controller unit, is adapted and configured to drive the light sources and/or projector so as to generate an object-specific illumination design pattern or illumination design figure on the surface area. This shall mean in particular, that the controller unit is adapted to generate or create an object-specific or object-dependent illumination pattern or figure, or illuminated patterns and/or figures within or on the surface area.

It shall be mentioned, that the light sources and/or projector may be based on colored light sources, in particular LED's, in order to generate colored illumination patterns and figures.

The illumination patterns and figures may be representative of the characteristic object feature. A link or a correlation between the object feature and illumination pattern or figure may be predefined or fixed, or it may be that the link or correlation can be freely defined by a user. The link or correlation between object feature and illumination pattern may be stored in a memory of the controller unit or in a database either remote or local, in particular in form of a template for future illumination scenarios.

For generating the illumination pattern or figure, it is required that the sensor senses, in particular identifies, the characteristic object feature. After having sensed the object feature, the respective illumination pattern or figure is generated on the surface area.

As can be seen, the interactive light fixture, which may in particular be implemented as a kitchen appliance, is suitable for enhancing or improving illumination varieties and possibilities. If the surface area corresponds to a table top or working area related to food preparation, presentation and/or consumption, a great variety in illumination related to food, eating and gastronomy can be provided. In particular, the gastronomic experience, physical experience and comfort related to cooking, eating and dining and the like can be enhanced.

In embodiments, the at least one characteristic feature of the sensed object is one of an object category, an object type, an object class, an object shape, an object size, an object color, an object position within the surface, an object position relative to at least one further object within the surface, and an object movement within the surface. Hence, almost any feature extractable from an object within the surface area, or in more detail within the field of view of the sensor, can be used and correlated with a specific illumination pattern or figure. The controller unit may be adapted in such a way, that the illumination pattern or figure is automatically generated as soon as the characteristic object feature, the object features or combination of object features is/are detected.

In particular different objects may be illuminated with different patterns, in particular different colored patterns, respectively with an object specific color. The color may for example be selected to highlight the object and/or to improve the appearance or visual impression of the object. Further, the appearance of a new object within the surface area and the removal of an object from the surface area can be accompanied by specific illumination patterns, which in particular may be linked to specific characteristics of the object. In addition, movements of the object within the surface area can be accompanied by a change in the illumination pattern or figure, in particular if the characteristic feature is a relative object position, such as a position of the moved object relative to another object within the surface area. Using the proposed object characteristics may lead to enhanced and improved perception, in particular selective perception, of objects, in particular of food objects or food products, during cooking or dining, for example.

In embodiments, the controller unit is adapted to generate or execute an illumination scenario comprising at least one, preferably several, successive illumination scenes of illumination design patterns or figures. The activation or appearance of an illumination scene of the illumination scenario is triggered by at least one of the at least one characteristic object feature. This in particular shall mean that the controller unit may be able to generate a sequence or succession of illumination patterns, in particular different illumination patterns, depending on the object or objects, or on characteristic features thereof, respectively present within or on the surface area. In this configuration, the preparation of a dish, or the consumption of a meal, in particular a multi course meal, may for example be accompanied by a sequence of different illumination scenes or patterns. In particular single preparation steps, or single courses of the meal may be accentuated by selective and specific illumination patterns. In this way, in particular perception and/or awareness of objects and situation in respective phases of preparing dishes or having a meal can be influenced, in particular intensified by visual effects.

The illumination scenario, in particular single illumination scenes as well as links or correlations between illumination scenes and characteristic object features, can be stored in a memory or database of the lighting fixture, in particular controller unit. The links or correlations between illumination scene or illumination pattern and object feature may be freely defined, selected or generated by a user. However, it is also possible that preset datasets if illumination scenarios are downloaded from a database or loaded from a memory. The database or memory may be a local database of the light fixture or may be a remote database, wherein the light fixture is configured to access the memory or database via cable-bound or wireless communication.

Data and datasets, in particular illumination design patterns and design features, scenes scenarios, characteristic features and combinations thereof may be downloaded or uploaded from remote devices, in particular mobile devices such as mobile phones or other mobile gadgets such as mobile computers, pc and tablet pc. It shall be noted, that it may be possible to generate illumination patterns or figures, illumination scenes and illumination scenarios on respective gadgets and devices and transfer them to the light fixture and/or database or memory.

In embodiments, the controller unit may be adapted and configured to generate, by operating the light sources and/or projector unit and sensor, a virtual user interface on the surface area. In this configuration, the controller unit may be adapted to record via interactive user inputs on the virtual user interface an illumination pattern, figure and/or scenario, in particular single scenes of a sequence of illumination patterns of an illumination scenario.

The recorded illumination scenario, i.e. either a single illumination pattern or figure or a combination of illumination patterns and figures, may be stored in a memory or database, in particular of the light fixture.

The recording of the illumination scenario in particular may comprise the selection, generation or design of illumination patterns and/or figures, the definition of objects and characteristic object features linked to the designs or figures, the interrelationship and mutual relation of objects within the surface area, the chronological order of the illumination patterns or figures and other parameters relevant for defining an illumination pattern and link or correlation with at least one object or at least one characteristic object feature.

Hence, the virtual user interface may comprise input sections for object selection, characteristic feature selection, object and feature correlation, illumination pattern or figure selection and, in particular, a design section configured to allow the user to generate individual designs. The design section in particular may provide graphic and painting tools, such as brushes, pens and so on, in particular tools for coloring, color filling, shading, texturing, for generating frames, geometric objects such as lines, squares, ovals and the like. Hence, individual illumination patterns or figures and individual scenarios can be generated by the user. For generating the scenarios, a section of the surface area may be defined or used as a drawing or design board. Drawing actions, i.e. movements of the hand or finger of the user over the surface area, and selections, involving touching upon the surface area can be recognized and analysed by the sensor of the light fixture.

It shall be noted, that an illumination scenario may comprise one or several illumination scenes, i.e. illumination patterns or figures, which shall mean, that the virtual user interface is also suitable for the design and generation of single illumination patterns or figures. The generation of an illumination scenario, in particular an illumination pattern or figure, may be generated in that the user moves his or her hand, finger or fingers over the virtual user interface and makes respective selections. In particular the definition of an illumination pattern or figure may comprise selecting a graphic tool via the virtual user interface and drawing and designing a graphic pattern, figure or motive on the surface area or a section thereof. This means, that the surface area in this case can be used as a drawing and design board, which has already been mentioned above. As already stated above, movements of the hand, fingers or finger of the user on the surface area, either used as a virtual user interface or as a design board, during the design and/or generation of an illumination scenario as well as in other situations can be detected and analysed by the sensor. Respective movements in particular may comprise the selection of items of the virtual user interface and/or movements related to the generation of graphic designs, figures or motives on the surface area.

In further embodiments, the at least one object may be a food product, i.e. an article of food, beverage and the like. In these embodiments, the controller unit may in a second operational mode be operable to drive the light sources, in particular at least a group or section thereof, and/or the projector unit, in dependency of at least one characteristic feature of the food product sensed or identified via the sensor, so as to generate an illumination design pattern or illumination design figure on the surface area, which pattern or figure is specific for the at least one food product and representative of a recipe related to the food product, i.e. suitable for or appropriate for the preparation of a meal or dish from the at least one food product.

The pattern or figure representative of the recipe may comprise instructions in written and/or graphic form and may be accompanied by graphic designs, patterns and ornaments and the like.

The written and/or graphic instructions may indicate single or a sequence of preparation steps required for obtaining a meal or dish according to a specific recipe.

Further, the recipe, in particular as presented to the user on the surface area, may comprise a list of constituents, ingredients and their amounts. Ingredients, amounts and the like may be indicated in written form and/or by graphical representations, such as icons, pictures and the like.

In a variant of the embodiment as described beforehand, the controller may be adapted to compare ingredients, in particular mandatory and/or essential ingredients, of the recipe with food products which are placed on or in the surface area and identified by the sensor. The controller unit in this variant may be further adapted to generate a list of missing ingredients and notify the list of missing ingredients, i.e. at least the missing ingredients to the user.

The generation of the list of missing ingredients may be based on the comparison of actually available food products placed on the surface area and products needed according to the recipe. For identifying the products on or in the surface are, the sensor may be used, which in particular in this case, but also generally may be implemented with an object recognition routine, preferably an automatic object recognition routine.

In case of uncertainties as to the identification of the food product, user input may be requested. The list of missing ingredients may be displayed on the surface area, for example, or be submitted to the user as an electronic or acoustic message, such as vie e-mail, via short messaging system and similar.

Implementing the aforementioned function of identifying missing ingredients may simplify cooking operations or procedures and are effective in assisting the user in carrying out the recipe and related instructions to prepare the meal or dish.

In further embodiments, the controller unit may be adapted to drive the light sources and/or projector unit to generate a sequence of illumination patterns or illumination figures on the surface area, wherein each illumination pattern or figure is representative of at least one preparation step for implementing a selected recipe. This in particular means, that the controller unit may indicate via a sequence of illumination patterns order, in particular chronological order for implementing a recipe. The illumination patterns and figures may comprise instructions, examples and/or information on how to treat or handle food products in respective phases of executing the recipe.

The instructions, examples and/or information may be given in written form and/or as graphic images or icons, both in static and/or animated form. If food products are still placed in or on the surface area, the food product/s to be processed or worked on in a certain preparation step may for example be highlighted, in particular illuminated. Graphic icons and other information provided for the single preparation steps may for example relate to the food products, to kitchen equipment, such as mixers, spoons, knives, needed for carrying out the respective preparation step and so on.

Indicating preparation steps of a recipe and correlated information of how to carry out the preparation step is a kind of user guidance, which may ease and speed up food preparation.

The recipe for which the user guidance is carried out by the controller unit may be selected by the user, for example via the virtual user interface as described above. The recipe may in particular be a recipe proposed by the controller unit, on the basis of detected food products contained in or on the surface area, which function has been described further above.

According to further embodiments, the controller unit is operable in a third operational mode, in which the surface area represents the object in the meaning of claim 1, and in which the controller unit is adapted to drive the light sources in order o illuminate the object, i.e. the surface area, in dependence of at least one surface characteristic. In this case, the characteristic object feature in the meaning of claim 1 is represented by a surface characteristic. In this embodiment, the interactive light fixture may provide the function of a conventional lamp or ordinary light source for illuminating, in particular homogenously illuminating the surface area, and as the case may be also surrounding and adjacent areas and/or objects. The ordinary lamp function may be used in addition to, in particular together with, any of the afore mentioned functions and operational modes.

The surface characteristic may for example be one of the color, texture, shape and similar properties of the surface area. The surface characteristic may be detected or sensed by the sensor of the interactive light fixture, in particular the surface characteristic may be extracted from an image of the surface area.

In embodiments of the proposed interactive light fixture, the light fixture has a sandwich-like design, structure or construction. In the sandwich-like construction, the light sources, the projector unit and the at least one sensor or sensor unit, and optionally a light diffusor, light reflector, electronic components, in particular the controller unit, are sandwiched between a top cover and a lower cover.

The top and lower cover are preferably of flat design, wherein at least the lower cover at least in sections is transparent such that light of the light sources can pass through and/or optical signals can pass through to the sensor. The lower cover may for example be made at least in the transparent sections from translucent glass.

Note that the sensor may be a camera or similar for generating and analyzing 2D or 3D representations of objects and scenes.

The proposed sandwich-like construction allows a comparatively compact, in particular flat design. Further comparatively large surface areas can be covered and impinged with the illumination patterns or illumination figures. The proposed configuration in particular allows the light fixture to be installed as conventional lamps, and may also be used as a substitute for conventional lamps. The light fixture may for example be installed above a table, in particular dining table, in a kitchen and/or above a work area in a kitchen.

In embodiments of the light fixture it may be provided that at least one of the sensor and projector, where applicable also at least a selection or group if the light sources, are mounted to a rotatable base. The rotatable base may be implemented to enable a rotating movement of respective elements, in particular within, in between the top and lower cover. #

Rotating movements may for example be executed by electric drives respectively provided and cooperating with a respective rotatable base.

Providing the sensor, projector, and where applicable light sources with the ability to be rotated increases the creative freedom for generating and/or designing the illumination patterns and figures. Also, the variety and/or orientation of possible surface areas that potentially can be impinged with illumination patterns or figures can be increased.

In particular with the previous embodiments, it may be provided that a rotational axis of the rotatable base is tilted against the main or mean optical radiation axis of the light fixture. This in particular may be advantageous for increasing the freedom of design for the illumination patterns and figures. In particular respective tilted axes may allow the generation of illumination patterns or figures on surfaces tilted against the horizontal direction.

In further embodiments, at least one of the plurality of light sources, in particular a group or sub-group, is implemented or adapted to be implemented or operated as a spot light. The spotlight may be implemented to be rotatable around a further rotational axis, preferably tilted against the main optical radiation axis of the light fixture. Spotlights may be useful in highlighting objects positioned or placed in or on the surface area. Highlighting may be useful in particular in operational modes in which interactive light fixture provides a user guidance.

Regarding the tilt axes as mentioned above, it shall be mentioned that if a main or primary section of a flat surface area with horizontal orientation or alignment is provided or used, the axes preferably are tilted against the normal of the primary surface area, i.e. the axes are not orthogonal to the primary surface area. The provision of tilted axes, as has been already mentioned, makes it in particular possible to adequately illuminate patterns or figures on tilted secondary surface areas, or even vertical secondary surface areas, which may be the case with objects such as food products, cookware, dishes, vessels, eating utensils and other kitchen and/or household utensils.

As can be seen, the proposed interactive light fixture is suitable to extend lighting and illumination possibilities and flexibility. Further, physical comfort and experience for cooking, dining and similar activities can be enhanced.

It shall be explicitly stated, that every function and feature of the light fixture as proposed herein may be used for or in a method or methods of generating illuminated patterns and/or figures on surfaces on the basis of at least one characteristic object feature. Further, the present invention may relate to a computer program product suitable for being stored in a controller module of a light fixture as proposed herein and adapted to drive and operate the light fixture as described herein.

According to claims 13 and 14, a kitchen appliance and illumination system are provided, respectively, which in each case comprise an interactive light source according to one of the above described embodiments and variants.

According to claim 15, a kitchen arrangement is provided which comprises at least one of the proposed illumination system. The kitchen arrangement in particular comprises an interactive light fixture according to any embodiment and variant as described above and further above. The kitchen arrangement may further comprise a kitchen or household appliance, such as an oven or a dishwasher, wherein the appliance and interactive light fixture may comprise a communication interface for mutual data exchange. Data exchange may be useful for example for user guidance in connection with the execution of recipes and other actions. Further, operational modes of the appliance may be indicated or notified by specific illumination patterns or figures.

Exemplary embodiments of the invention will now be described in connection with the annexed figures, in which.

It shall be mentioned that the invention is shown and described in connection with the figures in exemplary embodiments, which shall not narrow or restrict the scope of the invention and the scope of protection.

Figure 1:
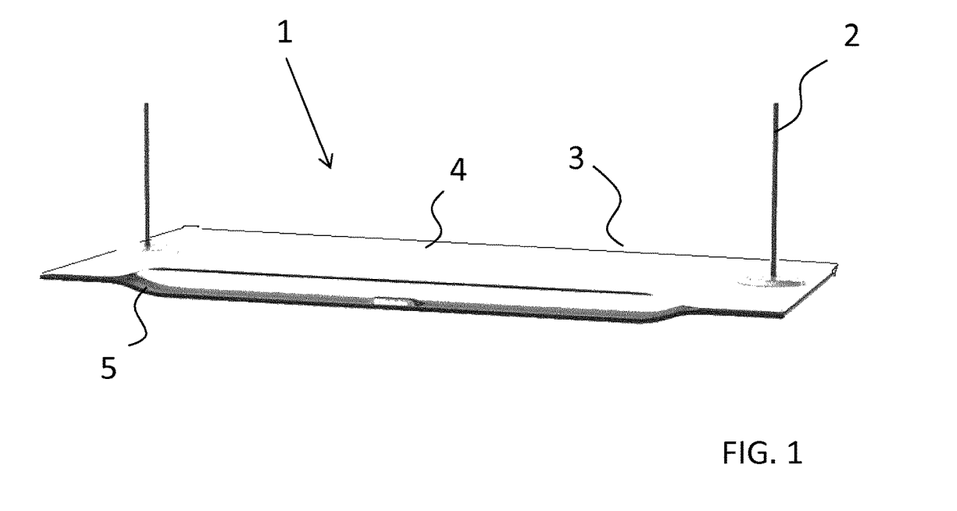
FIG. 1 shows a perspective view of an interactive light fixture.

FIG. 1 shows a perspective view of an interactive light fixture 1. The light fixture 1 comprises two suspension cables 2 intended and provided for attaching the light fixture to a ceiling (not shown) and also provided and used for connecting the light fixture to an external power supply line.

The light fixture 1 further comprises a main body 3 which is connected to the suspension cables 2 and thereby can be suspended freely over a table, in particular dining table, or work space.

The main body 3 comprises an upper cover 4 and a lower cover 5. The upper and lower cover 4, 5 at least in a central or mid section make up a type of casing adapted to accommodate components of the light fixture 1.

Figure 2:
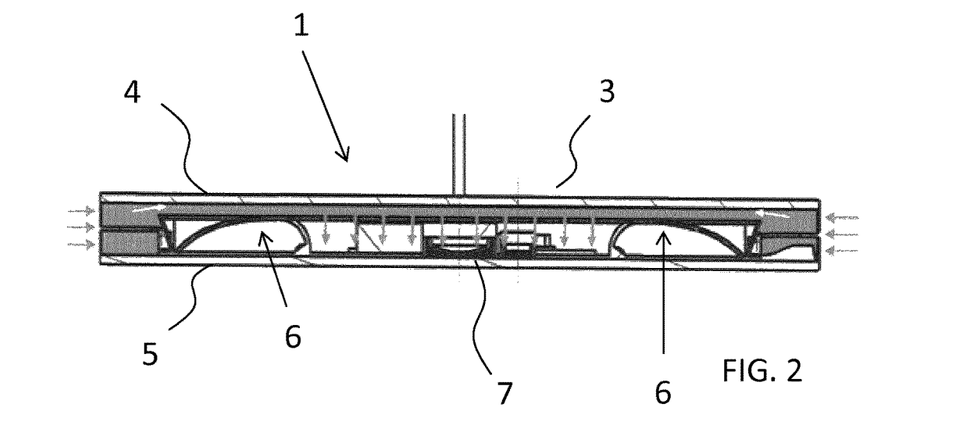
FIG. 2 shows a lateral cross sectional view of the light fixture.

FIG. 2 shows a lateral sectional view of the light fixture 1, in particular of the main body 3. In particular from FIG. 2 it can be seen that the main body 3 implements a type of casing accommodating components of the light fixture and providing further functions, such as cooling and the like. Note, that a cooling airflow is indicated in FIG. 2 by small arrows.

A cooling airflow in the present construction can be generated from outer, lateral air vents inwardly where further electric components are arranged.

From FIG. 2 a light source arrangement 6 for providing an indirect illumination and the location of a sensor 7 approximately in the middle of the main body 3 can be identified.

Figure 3:
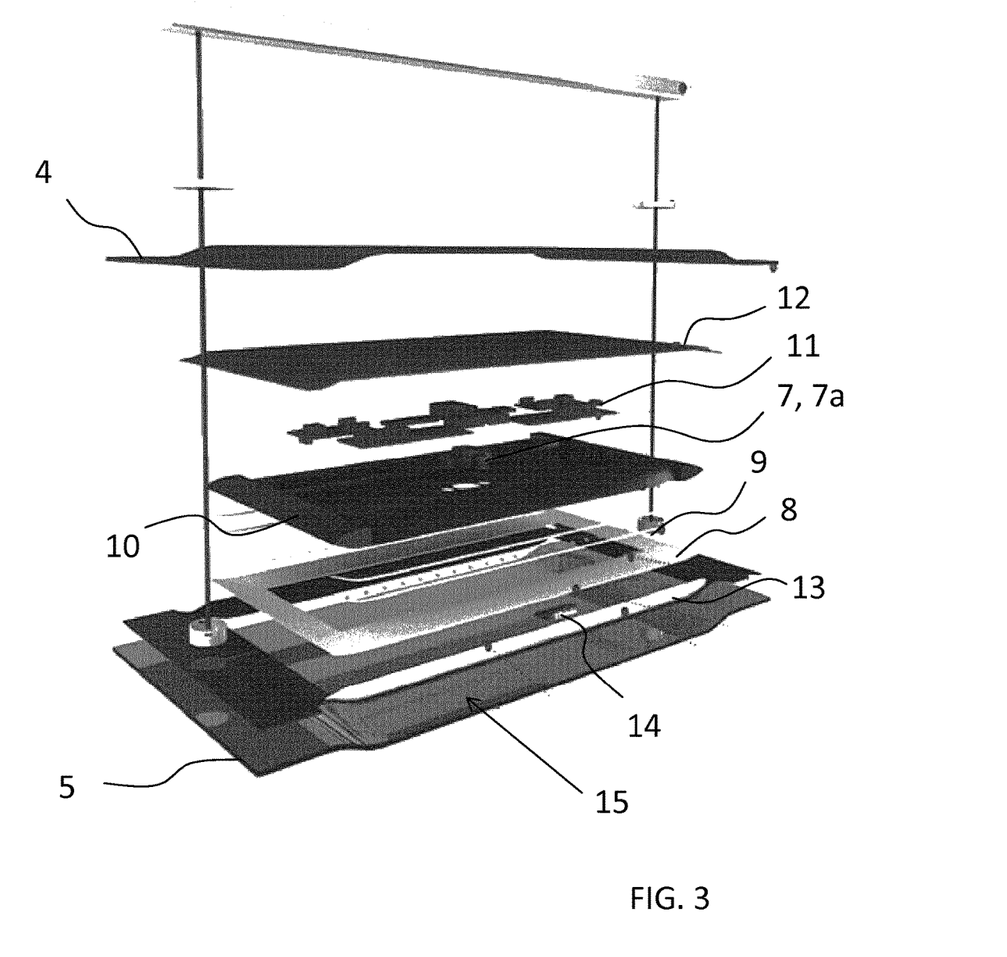
FIG. 3 shows an exploded view of the interactive light fixture.

FIG. 3 shows an exploded view of the light fixture 1. From FIG. 3 in particular the components sandwiched between the upper cover 4 and lower cover 5 are shown in more details.

In bottom-up direction, the components sandwiched between the covers 4 and 5 are as follows.

A light diffuser 8 is arranged above the lower cover 5, and an LED based illumination 9 is arranged thereabove. The LED based light source 9 may be operated to provide a conventional illumination, known in particular from conventional lamps. The light diffuser 8 is adapted to diffuse the light emitted by the LED based light source 9 in order to obtain adequate, in particular uniform, illumination, in particular indirect illumination.

Above the light LED based light source 9 there is provided a light deflecting cavity 10 adapted to cause the light generated by the LED based light source 9 to be emitted through the lower cover 5. The light reflecting cavity 10 with a light reflector is also adapted for preventing light of the LED based light source 9 to impinge on optical elements arranged thereabove, such for example the sensor 7.

The sensor 7 in particular is implemented as an optical sensor, such as a 2D or 3D imaging sensor. The sensor 7 is combined with a projector 7a, adapted to project illumination signals, patterns or figures to or onto a surface area underneath. The sensor 7 and projector 7a preferably make up a 3D projection and scanning system.

In the region of the sensor 7 or above the same, additional electronic components 11 are provided, which in particular may comprise a controller unit for controlling operation of the light fixture 1, in particular the LED based light source 9, the sensor 7 and projector 7a, and, where appropriate, a memory for storing data generated and/or used by the controller unit.

Finally, above the sensor 7 and the electronic components 11 an upper mask 12 is provided, which on the one hand may shield the components underneath, and further may be provided with aeration holes or vents required for adequate ventilation and aeration of the space sandwiched between the upper cover 4 and lower cover 5.

A lateral light reflector 13 is provided to suppress light emissions in lateral direction of the light fixture 1. Further a movement sensor 14 is arranged in the lateral section of the light fixture 1. The movement sensor 14 may be used in fixing and/or assigning operational modes of the light fixture 1, such as a cooking mode, an experience mode in which a certain lighting ambience may be generated, a conventional lamp mode, and a design mode in which the user can design illumination scenarios.

The lower cover 4 is made from glass and comprises at least one transparent section 15 such that light and optical signals can pass through. In particular light from the LED based light source 9 and projector 7a shall be able to pass outwards, and light reflected from objects shall be able to pass inwards to be sensed by the sensor 7.

Operation and operational modes of the light fixture 1 will now be described in connection with exemplary scenarios.

Figure 4:
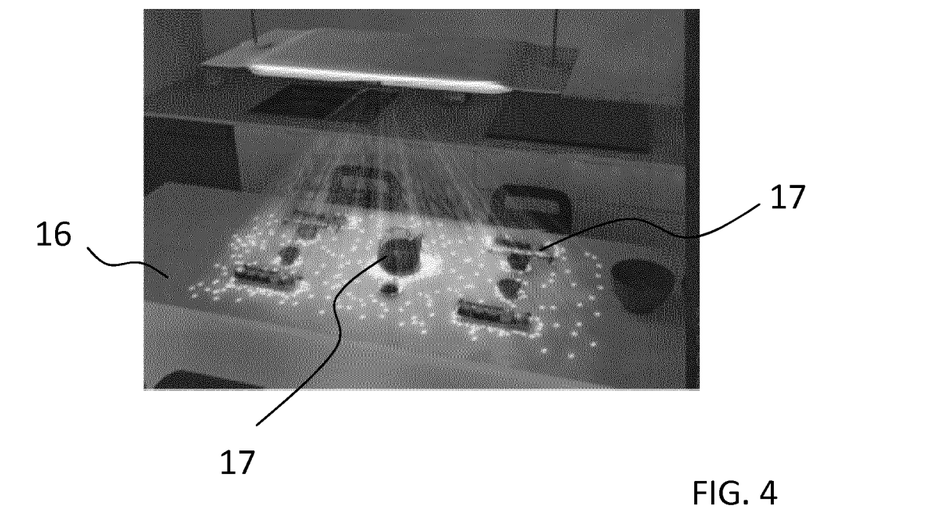
FIG. 4 shows a first illumination scenario generated by the light fixture.

FIG. 4 shows a first illumination scenario generated by the light fixture 1. In the shown scenario, the light fixture 1 generates an illumination design pattern on a table top 16 of a dining table. The illumination pattern in the present case comprises a plurality of illuminated spots distributed over the table top 16 and objects placed thereon.

On the table top 16 a couple of objects 17 are placed. Objects 17 identified by the sensor 7, such as the tea pot in the middle of the table top 16 are illuminated in a specific way, in which illuminated spots are concentrated in the region of the outline of respective objects 17. Spots present in areas distant from the outlines are less concentrated, i.e. more widely dispersed.

In particular in the illumination scenario described beforehand, the objects 17 are highlighted in order to generate a specific ambience for a possible tea and cake session. Note that the illumination pattern in the present case has been selected by the controller unit in dependence of characteristic features of the objects 17 placed on the table top 16. Such characteristic features may be extracted from sensor signals analyzed by the controller unit.

The characteristic features may for example correspond to the type of object or objects, and may relate to a single object or to a plurality of objects. In case that a plurality of objects is used, a combination or respective single features of the single objects may be decisive for selecting the illumination design pattern.

In the present case, 3D projection and scanning system may determine that a tea pot, candles, cakes or muffins and cups are present on the table top 16. Such a combination may be linked with an illumination pattern fixed and laid down in the memory and characterized as being suitable for tea and cake sessions.

Therefore, if the 3D projection and scanning system detects the characteristic features, in particular the combination of features, the controller unit can operate the light fixture 1 to generate or execute the illumination design pattern or scenario which is linked to the characteristic feature or feature combination.

Note that the present scenario is just one of a plurality of possibilities and other characteristic features, feature combinations linked to illumination patterns may be provided, in particular stored in a memory within the light fixture 1, or provided in an external database, accessible via cable bound and/or wireless communication.

The operational mode described above is, as already mentioned, suitable for generating illuminations for preset scenes and themes.

In the example given above, essentially only the objects as such have been used for selecting an illumination pattern. As already mentioned further above, other characteristic features may be used.

In particular, the position, relative position, mutual arrangement of objects, their appearance, presence, and absence and so on can be used for activating or selecting specific illumination patterns.

Figure 5:
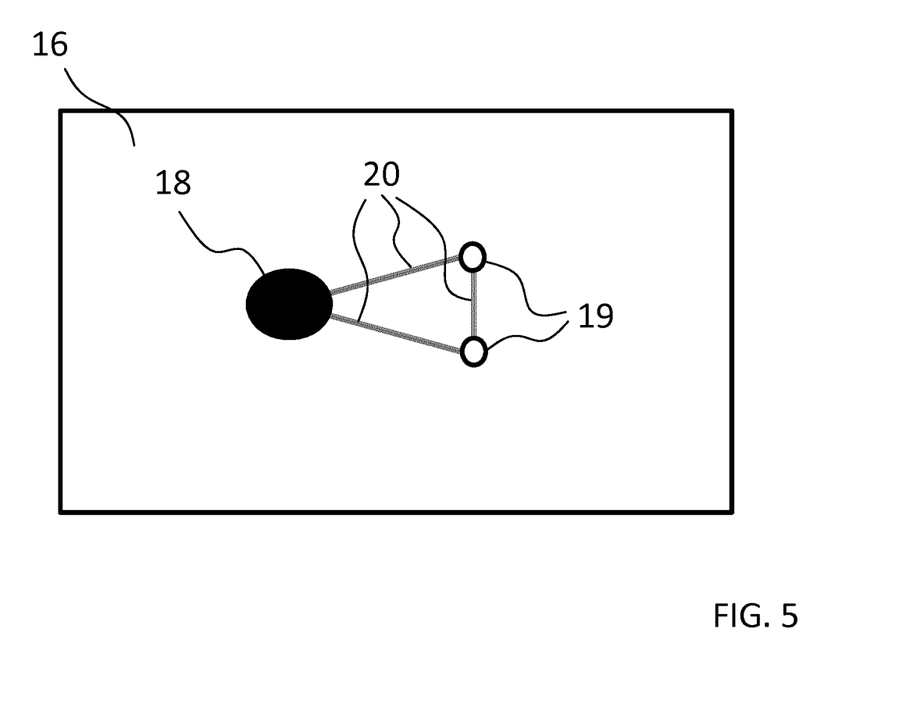
FIG. 5 shows a second illumination scenario generated by the light fixture.

FIG. 5 shows a further example of an illumination scenario generated by the light fixture 1. In the present, second illumination scenario, a bottle of wine 18 and two wine glasses 19 are present on the table top 16. In the experience mode operation of the light fixture 1, the 3D projection and scanning system detects the objects, i.e. the bottle of wine 18 and the two glasses 19 and their relative positions are determined. The relative position of the objects 18 and 19 is such that they span a triangle.

The mentioned characteristic features extracted from the 3D projection and scanning system in the second illumination scenario may be linked to a situation in which two people intend to sit together and drink a glass of wine. This situation in turn may be linked to an illumination pattern, stored in memory of in a database, desired for a respective situation.

The illumination pattern in the present case comprises essentially three illuminated lines 20 running between the bottle 18 and wine glasses 19 and defining a triangle with the bottle 18 and wine glasses 19 being arranged in the three corners of the triangle. The LED base light source 9 in the present scenario may be switched off or dimmed essentially off, so that the bottle 18 and wind glasses 19 are specially highlighted and a pleasant atmosphere is generated.

In the previous examples, the 3D projection and scanning system analyzed a given scenario, i.e. arrangement of objects in or on the table top 16, selected an illumination pattern and generated the illumination pattern according to predefined or stored rules.

The inventive light fixture 1 however may in embodiments also be implemented with functions that allow a user to set up and define illumination patterns, figures, scenes and whole scenarios and to map or assign objects and/or characteristic features of selected objects with illumination patterns, scenes or scenarios.

As an example, FIG. 6 to FIG. 9 show exemplary steps of setting up and defining an illumination scenario, which may be stored in a database, and which may be retrieved from the database again and executed in case that corresponding objects and/or characteristic features, in particular a combination of characteristic object features, are determined by the 3D projection and scanning system.

Figure 6:
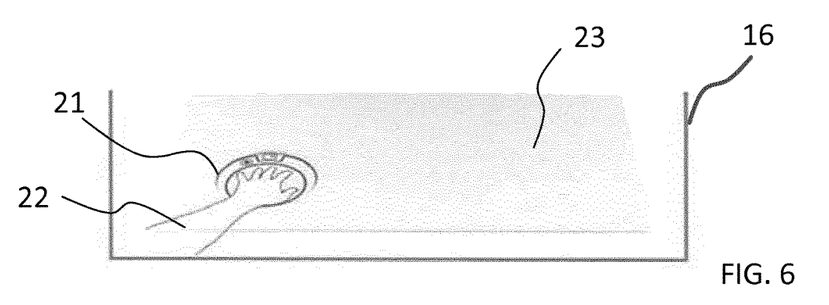
FIGS. 6 to 9 show exemplary steps of setting up an illumination scenario.

FIG. 6 shows the blank table top 16 onto which the 3D projection and scanning system has projected a virtual user interface 21. The virtual user interface 21 may be used by a user 22 as a conventional hardware user interface, wherein selectable information is projected onto the table top 16 via the projector 7a and selections and user inputs associated with movements of a finger of the hand of the user are sensed by the sensor 7.

The virtual user interface 21 in this example allows selecting dedicated functions, such as drawing graphic items, selecting illumination and/or background patterns, defining objects, defining object relationships and the like. The surface of the table top 16 outside the virtual user interface 21 in the present example is set up as a type of virtual design board 23 on which the user can draft illumination scenarios by respectively using the functions selected on the virtual user interface 21.

Figure 7:
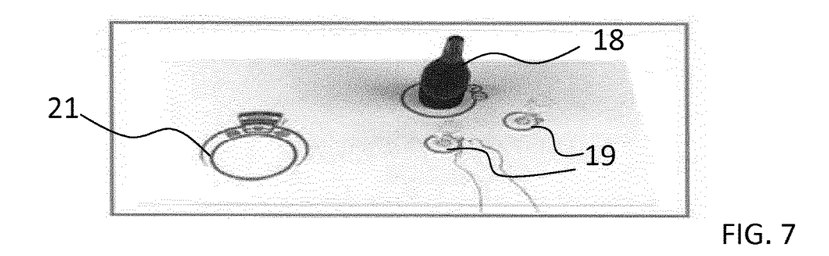

In FIG. 7 it is exemplarily depicted the definition of positions of a bottle 18 and two glasses 19, essentially corresponding to the scenario in FIG. 5. By selecting a respective tool on the virtual user interface 21, the user can also define positional relationships between the objects, i.e. the bottle 18 and glasses 19. In addition, the user may define via the virtual user interface 21 an illumination scene or illumination pattern, or even a sequence of illumination patterns or scenes, to be executed if the objects and respective characteristic features, in the present case positional relationships, are met. Regarding the scenario of FIG. 5, the user would have to define the three light bars running between the bottle 18 and glasses 19, respectively.

Figure 8:
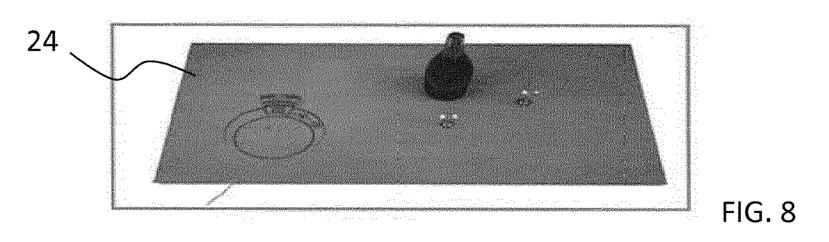

FIG. 8 exemplarily shows that in general it is possible that a background design 24 of the illumination scenario may be selected via the virtual user interface 21 by executing a respective "select background" function.

Figure 9:
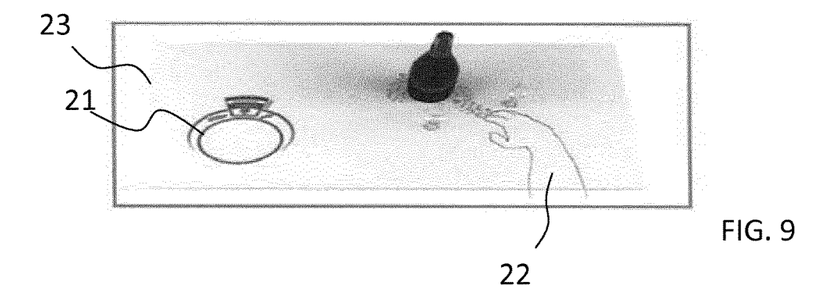

In FIG. 9 it is exemplarily depicted how free-form graphic elements can be generated. In the present example, the user 22 has selected on the virtual graphics interface 21 a painting function allowing him to generate a leave-like pattern. Then the user taps the design board 23 and draws a respective painting pattern by moving his hand over the design board 23. The movements are detected by the 3D projection and scanning system and the painted design is assigned to the draft illumination scenario.

If the user 22 has finished his design, he may, via the virtual user interface 21, save the designed illumination pattern in the memory or database so that the illumination scenario can subsequently be retrieved if respective characteristic object features and feature combinations are identified.

It shall be mentioned, that the design varieties and possibilities in general are comparatively extensive, as any objects, properties of objects, characteristic features of objects, positions, relative positions, colors, design patterns, shades, graphical images, icons, animated icons and figures and son on are suitable to be selected and implemented in the mode of setting up an illumination scenario.

Figure 10:
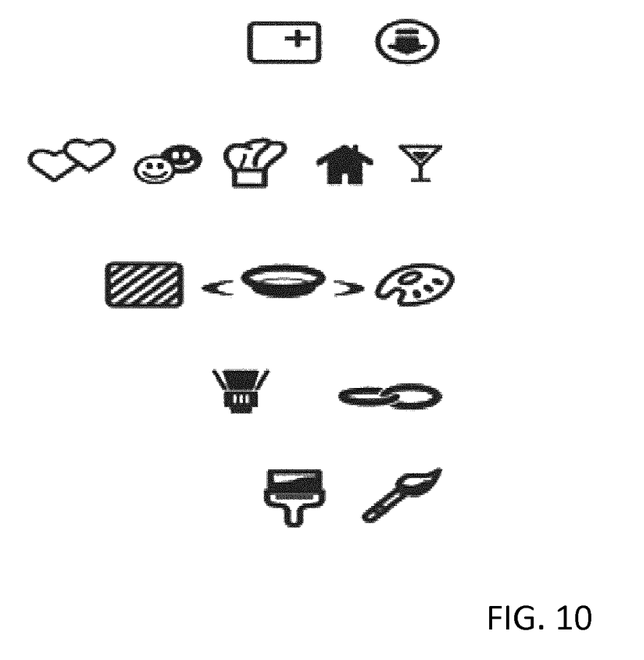
FIG. 10 shows exemplary design icons and icon-based design menus.

The virtual user interface 21 may, in the mode allowing to set up and define an illumination pattern, provide a great variety of different functions, which for example may be presented to a user via icons. The icons may be arranged and sorted in groups to simplify the process of setting up an illumination scenario or scene. It shall be mentioned, that an illumination scene may comprise a single illumination pattern, while an illumination scenario may comprise several subsequent illumination scenes.

An exemplary list of icons is shown in FIG. 10, in which some icons for designing and creating an illumination scenario are shown.

The icons in the first row in FIG. 10 relate to the options of defining a new illumination pattern and downloading an existing illumination pattern or scenario from a database. Note that it may be possible to load a pre-existing illumination scenario in order to modify it or generate a new illumination scenario therefrom.

The icons in the second row in FIG. 10 relate to different predefined themes that may be selected by the user. For example, the outermost right icon may relate or provide access to functions allowing the set-up of an illumination scenario adequate for cocktail parties, whereas the outermost left icon may relate or provide access to functions allowing the set-up of an illumination scenario for dates and rendezvous.

The icons in the third row in FIG. 10 relate to the selection or definition of shades and colors or color scales.

The icons in the fourth row in FIG. 10 may relate to the definition or the addition of new objects and their positions, and the definition and creation of mutual links between single objects.

The icons in the last row in FIG. 10 relate to graphics functions such for example different types of brush strokes.

FIG. 10 only gives a very restricted overview of the possibilities of the design options. It shall be noted, that icons for any type of design option may be provided by the virtual user interface 21. Further, it shall be noted that the design options provided by the virtual user interface 21 may correspond to the technical capabilities of the light fixture 1, in particular the LED based light source 9, the projector 7a and/or sensor 7.

Figure 11:
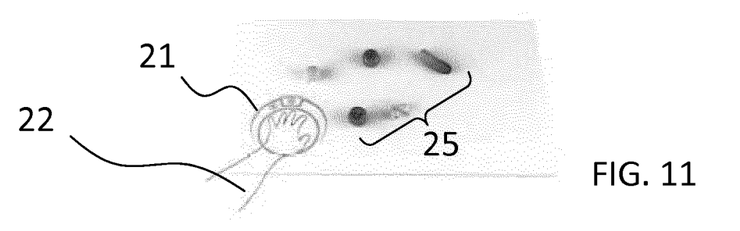
FIGS. 11 to 13 show exemplary steps of user guidance in connection with cooking recipes.
Figure 12:
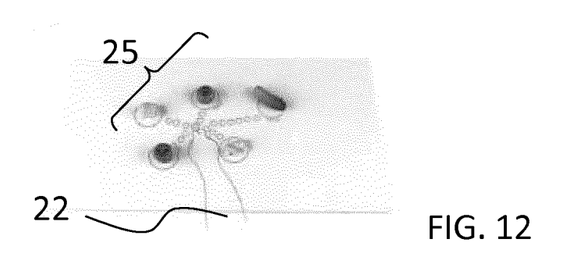
Figure 13:
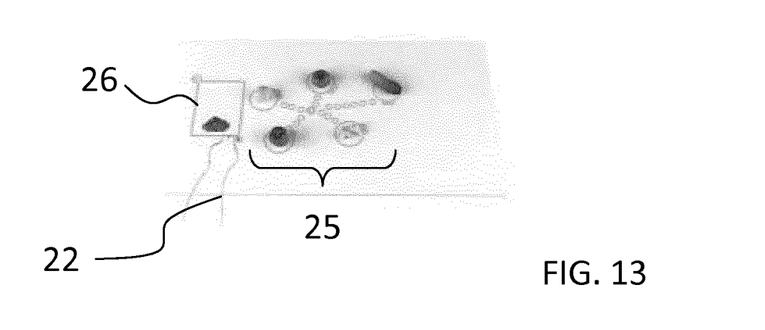

With reference to FIGS. 11 to 13, exemplary steps of a further operational mode in which the light fixture 1 may provide user guidance for carrying out cooking recipes are provided.

As a starting point, the user 22 may place different food products, such as vegetables and/or meat, onto the table top 16. Then, the user may activate via the virtual user interface 21 and the 3D projection and scanning system in order to automatically detect and define the type of the food products positioned on the table top 16. Here, the 3D projection and scanning system may provide an automatic object detection functionality.

In FIG. 12, the situation is shown in which the 3D projection and scanning system has detected the food products 25 and displays an illumination pattern on the table top 16 according to the detection result. In the present case, each food product 25 is bordered by an illuminated frame and the food products 25 are interconnected by straight illuminated lines. The user 22 may confirm the assignment and identification of the food products 25 as carried out by the 3D projection and scanning system, in particular by tipping on a specific illuminated spot on the table top 16.

Thereafter, the controller unit may browse or search a database containing a plurality of recipes for recipes suitable for the detected types, number, volumes and/or weight of food products. In case that the controller unit can identify one or more suitable recipes, the identified recipes, in particular a list thereof, may be projected and displayed on the table top in form of a virtual user interface in which the user 22 can freely select one of the displayed recipes, in particular for execution and/or for further information.

After selection of a specific recipe, the specific recipe 26 may be displayed, i.e. projected by the light fixture 1, in more details by the projector 7a, on the table top 16. In addition, the 3D projection and scanning system may provide on the table top, by generating illumination patterns, user instructions of how to execute the steps, in particular every single step, of the recipe. This in particular may involve the display of illumination patterns indicating actions to perform on one or all of the food products, or may relate to actions to be performed without the food products and the like. The user guidance may in particular comprise text, figures, icons and the like both in static and animated form.

It shall be noted, that the invention in general also allows to set up and define new recipes, i.e. illumination patterns and illumination sequences or scenarios related to the execution of a recipe. Here the same functions may be used as described further above with respect to setting up an illumination scenario for a specific combination of characteristic features of objects. This in particular shall mean that the light fixture 1 may be configured to define a flow trace of a recipe by a sequence of illumination patterns. Respective illumination patterns may relate to the types of ingredients and food products, either in form of text or images and others, and actions to be performed with the ingredients, actions to be performed beyond the ingredients and so on.

It shall be mentioned, that in case that the identified food products are not adequate or sufficient for a recipe stored or provided in a database, the light fixture 1, in particular the controller unit, may be adapted to generate a list of missing food products, i.e. ingredients. The list may be notified to the user 22 on the virtual user interface, on the table top 16 via a suitable projection, via e-mail or similar.

Further, it shall be mentioned that the controller unit may be adapted to sort suitable recipes according to the conformity in number and/or amount between required and available ingredients, and to display a list of possible recipes according to the conformity with available ingredients. Other sorting algorithms may be conceivable, and in particular may be defined by the user 22.

To summarize the above description of exemplary embodiments, it can be seen that the proposed light fixture is suitable for solving the underlying problems.

LIST OF REFERENCE NUMERALS

1 interactive light fixture
2 suspension cable
3 main body
4 upper cover
5 lower cover
6 light source arrangement
7 sensor
7a projector
8 light diffuser
9 LED based light source
10 light deflecting cavity
11 electronic components
12 upper mask
13 lateral light reflector
14 movement sensor
15 transparent section
16 table top
17 object
18 bottle of wine
19 wine glass
20 illuminated line
21 virtual user interface
22 user
23 design board
24 backgroud design
25 food product
26 recipe

The invention claimed is:

1. Interactive light fixture (1) comprising:
a plurality of light sources (9);
a projector unit (7a) for illuminating a defined surface area (16);
at least one sensor (7) for sensing objects (17, 18, 19, 25) within the surface area (16);
a controller unit cooperating with the light sources (9), the projector unit (7a) and the sensor (7), wherein the controller unit is configured to drive the light sources (9) and/or the projector unit (7a) in a plurality of operational modes based on at least one sensed object in order to generate an object-specific illumination design pattern or design figure on the surface area; and
a movement sensor (14) arranged in a lateral section of the light fixture (1) and operatively connected to the controller unit, wherein the controller unit is configured to select an operational mode of the light fixture (1) from the plurality of operational modes based on input from the movement sensor (14) and the at least one sensor (7), the plurality of the operational modes comprising: a cooking operational mode, an experience operational mode generating a different lighting ambience based on the at least one sensed object, an illuminating operational mode for illuminating the defined surface area (16), and a design operational mode with design illumination scenarios generated by a user via interactive user inputs on a virtual user interface (21) on the surface area (16),
wherein the virtual user interface (21) comprises a design board with graphic and painting tools configured to allow the user to generate individual designs by coloring, color filling, shading, texturing, and generating frames of geometric objects,
wherein the controller unit is adapted to record and store single scenes of a sequence of illumination design patterns of the design illumination scenarios via the interactive user inputs on the virtual user interface (21), and
wherein the controller unit is adapted to generate the object-specific illumination design pattern or design figure on the surface area using the sequence of illumination design patterns of the design illumination scenarios including instructions and handling information regarding the objects (17, 18, 19, 25) sensed within the surface area (16).

2. Interactive light fixture (1) according to claim 1, wherein at least one characteristic feature of the sensed object (17, 18, 19, 25) is one of an object category, object class, object shape, object size, object color, object position within the surface, object position relative to at least one further object within the surface area (16), and object movement within the surface area (16).

3. Interactive light fixture (1) according to claim 1, wherein the controller unit is adapted to execute an illumination scenario comprising successive illumination scenes of design patterns or figures, wherein an activation of the illumination scenes is triggered by at least one characteristic object feature of the at least one sensed object.

4. Interactive light fixture (1) according to claim 1, wherein the controller unit is adapted and configured to generate, by operating the light sources (9) and/or the projector unit (7a) and sensor (7), the virtual user interface (21) on the surface area (16).

5. Interactive light fixture (1) according to claim 1, wherein the at least one object is a food product (25), and wherein the controller unit in the cooking operational mode is operable to drive the light sources (9) and/or the projector unit (7a), in dependency of at least one characteristic feature of the food product (25) sensed via the sensor (7), in order to generate an illumination design pattern or illumination design figure on the surface, which pattern or figure is specific for the food product (25) and representative of a recipe (26) related to the food product (25).

6. Interactive light fixture (1) according to claim 5, wherein the controller unit is adapted to compare ingredients of the recipe (26) with food products (25) which are placed in the surface area (16) and identified via the sensor (7), and, based on the comparison, to generate a list of missing ingredients, and to notify the list of missing ingredients to the user (22).

7. Interactive light fixture (1) according to claim 5, wherein the controller unit is adapted to drive the light sources (9) and/or projector unit (7) to generate a sequence of illumination patterns on the surface area (16) wherein each illumination pattern is representative of at least one preparation step for implementing a selected recipe (26).

8. Interactive light fixture (1) according to claim 1, wherein in the illuminating operational mode, the surface area (16) defines the object, and the controller unit is adapted to drive the light sources (9) to illuminate the surface area (16) in dependence of at least one surface area characteristic.

9. Interactive light fixture (1) according to claim 1, wherein the light fixture (1) has a sandwichlike design, in which the light sources (9), the projector unit (7a), the at least one sensor (7), a light diffuser (8), a light reflector, and the controller unit, are sandwiched between a top cover (4) and a lower cover (5) of the interactive light fixture (1).

10. Interactive light fixture (1) according to claim 9, wherein at least one of the at least one sensor (7) and projector unit (7a) are mounted to a rotatable base configured to enable a rotating movement of at least one of the at least one sensor (7) and the projector unit (7a) between the top cover (4) and the lower cover (5).

11. Interactive light fixture (1) according to claim 10, wherein a rotational axis of the rotatable base is tilted against the main optical radiation axis of the light fixture (1).

12. Interactive light fixture (1) according to of claim 11, wherein at least one of the plurality of light sources (9) is implemented as a spot light, implemented to be rotatable around a further rotational axis tilted against the main optical radiation axis of the light fixture (1).

13. Kitchen appliance, comprising an interactive light fixture (1) according to claim 1.

14. Interactive light fixture (1) according to claim 1, wherein the controller unit is implemented on an electronics board of the light fixture (1).

15. Interactive light fixture (1) according to claim 11, further comprising an electric drive operatively connected to the rotatable base and configured to provide a rotating movement the rotatable base.

16. Interactive light fixture (1) according to claim 1, wherein the controller unit is sandwiched between a top cover (4) and lower cover (5) of the interactive light fixture (1).

17. Kitchen appliance according to claim 13, wherein the controller unit is configured to project and display the object-specific illumination design pattern or design figure on the surface area of a working area of a kitchen or a table top in the kitchen or a dining room.

18. Interactive light fixture (1) comprising:
a top cover (4) and a lower cover (5), both having a flat design;
a plurality of light sources (9);
a projector unit (7a) for illuminating a defined surface area (16);
at least one sensor (7) for sensing objects (17, 18, 19, 25) within the surface area (16); and
a controller unit cooperating with the light sources (9), the projector unit (7a) and the sensor (7),
wherein the controller unit is configured to drive the light sources (9) and/or the projector unit (7a) in dependency of at least one characteristic object feature of at least one sensed object (17, 18, 19, 25) in order to generate an object-specific illumination design pattern or design figure on the surface area via interactive user inputs on a virtual user interface (21) on the surface area,
wherein the plurality of the light sources (9), the projector unit (7a), the at least one sensor (7), a light diffuser (8), a light reflector, and the controller unit, are arranged between the top cover (4) and the lower cover (5), and parallel to the top cover (4) and the lower cover (5),
wherein the virtual user interface (21) comprises a design board with graphic and painting tools configured to allow the user to generate individual designs by coloring, color filling, shading, texturing, and generating frames of geometric objects,
wherein the controller unit is adapted to record and store single scenes of a sequence of illumination design patterns of design illumination scenarios via the interactive user inputs on the virtual user interface (21), and
wherein the controller unit is adapted to generate the object-specific illumination design pattern or design figure on the surface area using the sequence of illumination design patterns of the design illumination scenarios including instructions and handling information regarding the objects (17, 18, 19, 25) sensed within the surface area (16).

19. Interactive light fixture (1) according to claim 1, wherein the design illumination scenarios are generated by the user based on illumination design patterns, design features, scenes scenarios, characteristic features, and combinations thereof that are downloaded from mobile devices, stored in a memory, selected by the user, and modified with the graphic and painting tools to generate new individual scenarios.

20. Interactive light fixture (1) comprising:
a plurality of light sources (9);
a projector unit (7a) for illuminating a defined surface area (16);
at least one sensor (7) for sensing objects (17, 18, 19, 25) within the surface area (16); and
a controller unit cooperating with the light sources (9), the projector unit (7a) and the sensor (7),
wherein, in a first operational mode, the controller unit is configured to drive the light sources (9) and/or the projector unit (7a) in dependency of at least one characteristic object feature of at least one sensed object in order to generate an object-specific illumination design pattern or design figure on the surface area,
wherein, in a second operational mode, the at least one object is at least one food product, and the controller unit is configured to drive the light sources (9) and/or the projector unit (7a) in dependency of at least one characteristic feature of the at least one food product sensed via the at least one sensor (7), in order to generate an illumination design pattern or illumination design figure on the surface area, said illumination design pattern or illumination design figure being specific for the at least one food product and being representative of a recipe related to the at least one food product, wherein, in a third operational mode, the surface area defines the at least one object, and the controller unit is configured to drive the light sources (9) to illuminate the surface area in dependence of at least one surface area characteristic, wherein the controller unit is adapted to record and store single scenes of a sequence of illumination design patterns of design illumination scenarios via interactive user inputs on a virtual user interface, and wherein the controller unit is adapted to generate the object-specific illumination design pattern or design figure on the surface area using the sequence of illumination design patterns of the design illumination scenarios including instructions and handling information regarding the objects (17, 18, 19, 25) sensed within the surface area (16).

* * * * *